(12) United States Patent
Fukuda

(10) Patent No.: US 7,738,916 B2
(45) Date of Patent: Jun. 15, 2010

(54) PORTABLE TERMINAL DEVICE WITH BUILT-IN FINGERPRINT SENSOR

(75) Inventor: Koki Fukuda, Higashimurayama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 10/549,201

(22) PCT Filed: May 19, 2004

(86) PCT No.: PCT/JP2004/007151

§ 371 (c)(1),
(2), (4) Date: May 26, 2006

(87) PCT Pub. No.: WO2004/104813

PCT Pub. Date: Dec. 2, 2004

(65) Prior Publication Data

US 2007/0008066 A1      Jan. 11, 2007

(30) Foreign Application Priority Data

May 21, 2003   (JP)   ............................. 2003-142934

(51) Int. Cl.
*H04M 1/00* (2006.01)

(52) U.S. Cl. ................. 455/556.1; 455/411; 455/550.1; 455/90.3; 345/173; 382/124; 382/126

(58) Field of Classification Search ................. 455/410, 455/411, 550.1, 566.1, 90.3; 345/173; 382/124, 382/126
See application file for complete search history.

(56) References Cited

U.S. PATENT DOCUMENTS

| | | | |
|---|---|---|---|
| 5,109,428 A * | 4/1992 | Igaki et al. .................. 382/125 |
| 5,508,719 A * | 4/1996 | Gervais ....................... 345/157 |
| 5,943,044 A * | 8/1999 | Martinelli et al. ............ 345/174 |
| 6,104,922 A * | 8/2000 | Baumann ..................... 455/410 |
| 6,124,845 A * | 9/2000 | Toda et al. .................. 345/157 |
| 6,195,568 B1 * | 2/2001 | Irvin .......................... 455/563 |
| 6,298,230 B1 * | 10/2001 | Schneider-Hufschmidt . 455/411 |

(Continued)

FOREIGN PATENT DOCUMENTS

JP       2002-41169       2/2002

(Continued)

OTHER PUBLICATIONS

Yomiuri PC, vol. 2, pp. 40-43, (2002).

*Primary Examiner*—Matthew D Anderson
*Assistant Examiner*—April G Gonzales
(74) *Attorney, Agent, or Firm*—Dickstein Shapiro LLP

(57) ABSTRACT

To provide a hand-held device with built-in fingerprint sensor provided on a control panel, which does not ruins the operability of the movement of a cursor or a pointer of the display screen.

A hand-held device with built-in fingerprint sensor comprises a fingerprint sensor for the fingerprint attestation provided on a control panel. A cursor or a pointer displayed on a display unit is moved according to a time change in the position where the pressure is provided or the movement of the finger on the sensor side of the fingerprint sensor. Further, the timing when said time change is detected is decided according to a time change in the position of the finger on said sensor side or the applied pressure.

11 Claims, 9 Drawing Sheets

U.S. PATENT DOCUMENTS

| | | | |
|---|---|---|---|
| 6,353,472 B1* | 3/2002 | Bault | 356/71 |
| 6,940,494 B2* | 9/2005 | Hoshino et al. | 345/173 |
| 6,947,580 B1* | 9/2005 | Kinsella | 382/124 |
| 7,162,059 B2* | 1/2007 | Yoo et al. | 382/124 |
| 7,239,304 B2* | 7/2007 | Hoshino et al. | 345/175 |
| 7,280,677 B2* | 10/2007 | Chandler et al. | 382/116 |
| 7,289,649 B1* | 10/2007 | Walley et al. | 382/124 |
| 7,389,103 B2* | 6/2008 | Stepanian | 455/344 |
| 7,444,130 B2* | 10/2008 | Stepanian | 455/344 |
| 2001/0017934 A1* | 8/2001 | Paloniemi et al. | 382/107 |
| 2002/0030668 A1* | 3/2002 | Hoshino et al. | 345/175 |
| 2002/0052192 A1* | 5/2002 | Yamazaki et al. | 455/411 |
| 2002/0168961 A1* | 11/2002 | Ohba | 455/410 |
| 2004/0132490 A1* | 7/2004 | Jerbi et al. | 455/556.1 |
| 2005/0012714 A1* | 1/2005 | Russo et al. | 345/157 |
| 2005/0041841 A1* | 2/2005 | Yoo et al. | 382/124 |
| 2005/0083310 A1* | 4/2005 | Safai et al. | 345/173 |
| 2005/0085217 A1* | 4/2005 | Lim | 455/410 |
| 2005/0113071 A1* | 5/2005 | Nagata | 455/411 |
| 2005/0226469 A1* | 10/2005 | Ho | 382/115 |
| 2006/0034499 A1* | 2/2006 | Shinoda et al. | 382/124 |
| 2006/0093192 A1* | 5/2006 | Bechtel | 382/126 |
| 2006/0110012 A1* | 5/2006 | Ritter | 382/115 |
| 2008/0219521 A1* | 9/2008 | Benkley et al. | 382/124 |
| 2008/0240523 A1* | 10/2008 | Benkley et al. | 382/126 |

FOREIGN PATENT DOCUMENTS

| | | |
|---|---|---|
| JP | 2002-44727 | 2/2002 |
| JP | 2002-62983 | 2/2002 |
| JP | 2002-183076 | 6/2002 |
| JP | 2002-330202 | 11/2002 |
| JP | 2002-352234 | 12/2002 |

* cited by examiner

PORTABLE TERMINAL DEVICE WITH BUILT-IN FINGERPRINT SENSOR

TECHNICAL FIELD

The present invention relates to a hand-held device provided with a sensor which attests the fingerprint.

BACKGROUND ART

To prevent unauthorized uses other than the owner as a hand-held device such as a portable telephone spreads, the hand-held device with built-in function of the fingerprint attestation is proposed (For instance, refer to Japanese Patent Application Laid-Open No. 2002-330202).

The fingerprint sensor is built into central position of a control panel in this device. The unauthorized use is prevented by automatically attesting the fingerprint when the fingerprint such as the left hand thumbs which the user usually uses for the operation is registered beforehand, and the hand-held device is used.

This configuration comprises the piezo-electric type fingerprint sensor or the electrostatic capacity type fingerprint sensor. In addition, cursor buttons are provided on the above and below and the right and left in its surroundings. The fingerprint attestation is carried out by the fingerprint sensor, and the cursor movement on the display screen is done with the cursor button.

DISCLOSURE OF INVENTION

In the above-mentioned hand-held device with built-in fingerprint sensor, the fingerprint attestation is carried out by the fingerprint sensor, and the movement of the cursor or the pointer on the display screen is done with the cursor button provided around the fingerprint sensor. For instance, the size from all sides almost 9 millimeters to all sides 15 millimeters is enough as the size of fingerprint sensor necessary for attesting the fingerprint on the basis of the belly side of the thumb of an adult man's left hand. On the other hand, the cursor movement on the display screen is carried out by pushing the cursor button provided several millimeters apart in the surroundings of the fingerprint sensor with the thumb. Therefore, the intervals of the upper and lower cursor buttons or the right and left cursor button become length where several millimeters are added to 15 millimeters, and exceed the size of the belly side of the thumb considerably. That is, it is necessary to shift the entire thumb up and down by 15 millimeters or more when the lower cursor button is pushed after the upper cursor button is pushed. As a result, the operability deteriorates very much. This is same in the right and left cursor buttons.

An object of the present invention is to provide a hand-held device with built-in fingerprint sensor provided on a control panel, which does not ruins the operability of the movement of a cursor or a pointer of the display screen.

In one embodiment of the present invention, a hand-held device with built-in fingerprint sensor comprises a fingerprint sensor for the fingerprint attestation provided on a control panel. A cursor or a pointer displayed on a display unit is moved according to a time change in the position where the pressure is provided or the movement of the finger on the sensor side of the fingerprint sensor.

Further, the timing when said time change is detected is decided according to a time change in the position of the finger on said sensor side or the applied pressure.

Further, the timing when said time change is detected is decided according to a time change in the position of the finger on said sensor side or the applied pressure.

Moreover, one embodiment of the present invention comprises a fingerprint sensor for fingerprint attestation provided on control panel, and a display unit which displays a message indicative of the completion of the fingerprint registration after an arbitrary finger is pressed against said fingerprint sensor until the information necessary for registering fingerprint can be read.

Moreover, one embodiment of the present invention comprises a fingerprint sensor for fingerprint attestation provided on a control panel, and a display unit which displays an address (IP) of the fingerprint registered as an attestation fingerprint for function unlocking.

Moreover, one embodiment of the present invention comprises a fingerprint sensor for fingerprint attestation provided on a control panel, in which two or more fingerprints are memorized by said fingerprint sensor, and an information registration means which the associated information on each fingerprint is registered, wherein the use of the information registered in the information registration means is permitted only when the fingerprint attestation matches with the fingerprint which is associated with information registered in the information registration means.

Moreover, one embodiment of the present invention comprises a fingerprint sensor for fingerprint attestation provided on a control panel, and a display unit which displays an image, wherein step is provided between said control panel and said fingerprint sensor.

BEST MODE FOR IMPLEMENTING THE INVENTION

Figure 1:
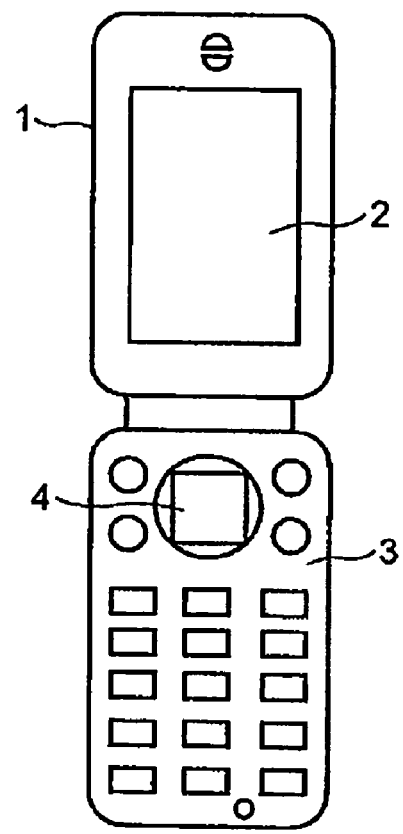
FIG. 1 is a front elevation of a hand-held device.

Hereafter, embodiments of the present invention are explained by using the drawings. FIG. 1 is front elevation of a hand-held device. Main body 1 comprises display unit 2 and control panel 3. A character is displayed on display unit 2 by pushing various buttons provided to control panel 3, and the desired menu is selected and indicated by moving the displayed cursor. Fingerprint sensor part 4 is provided on the position of control panel 3 where it is easy for the berry side of finger to touch when holding said control panel with either one of right and left hands. The size of fingerprint sensor part 4 is decided from a necessary area of the fingerprint necessary to attest the fingerprint. The sizes from all sides 9 millimeters to all sides 15 millimeters are usually preferable. Because it only has to be shape that information on the fingerprint can be acquired when the fingerprint is registered or attested, as for the shape of fingerprint sensor part 4, its shape is not limited to the specified one, for instance, the square, the rectangle, the circle, and the oval are acceptable for the shape.

On fingerprint sensor part 4, the belly side of the finger is moved up and down or right and left, or the finger itself is moved. The cursor moves on the display screen when the movement of the finger is detect ed. Thus, because the cursor button need not be provided in the surroundings of the fingerprint sensor, it excels in operability, it is compact though it has multi-functions, and is possible to design simply.

Any type of sensors can be used If the movement of the finger, the rub (swipe), and the magnitude of the pressure provided by the press of the belly side of the finger on the fingerprint sensor can be detected or judged though there are various type of sensors such as a pressure-sensitive type, the piezo-electric type, an electrostatic type, a magnetic type, optics type, and a thermal type, etc. as a kind of the fingerprint sensor.

Figure 2:
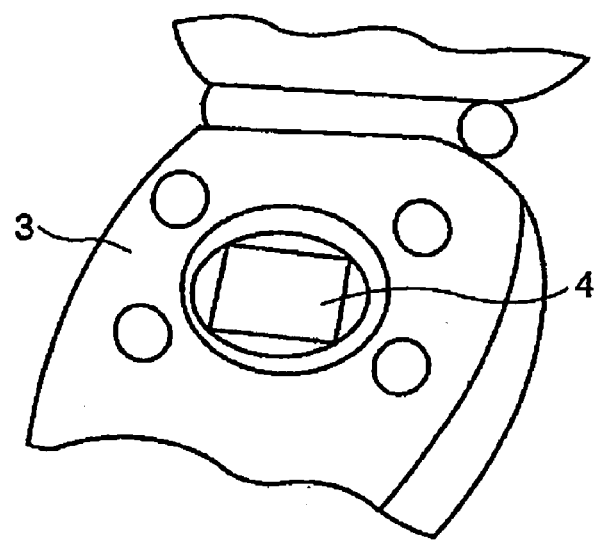
FIG. 2 is an enlarged perspective view of a fingerprint sensor part.

FIG. 2 is an enlarged perspective view of fingerprint sensor part 4. The face of fingerprint sensor part 4 is slightly lower than the face of control panel 3. By providing the step to the face of control panel 3, it becomes possible to confirm the position of fingerprint sensor part 4 easily and to prevent the displacement when the fingerprint is confirmed. Accordingly, the effective positioning of the finger becomes easy, too. It is possible to make the step higher or lower. Further, it is possible to provide a thin and little height frame in the boundary part of control panel 3 and fingerprint sensor part 4 to achieve a similar effect.

Thus, because a fingerprint sensor for fingerprint attestation provided on a control panel and a display unit which displays an image are provided, and step is provided between said control panel and said fingerprint sensor, the positioning of the finger becomes easy, the displacement of the finger at the fingerprint attestation can be prevented, and the operability is improved. As a result, the attestation rate when the fingerprint is attested can be improved, and the false recognition can be prevented.

Figure 3:
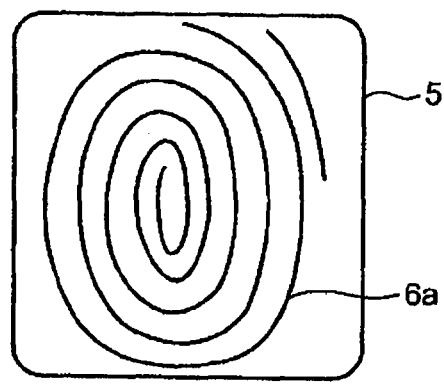
FIG. 3 is a screen view showing the image of the fingerprint displayed on the display unit.
Figure 4:
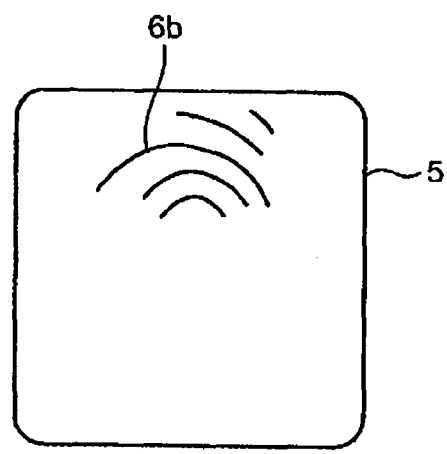
FIG. 4 is a screen view showing the image of the fingerprint displayed on the display unit.

FIG. 3 and FIG. 4 are screen views provided by amplifying a signal detected by fingerprint sensor part 4 and making an image on display screen 5 (not shown). It is possible, for instance, to confirm by seeing the state of the fingerprint registered for the fingerprint attestation if display unit 2 of hand-held device 1 is used as display screen 5. To attest, fingerprint 6a of one finger shown in FIG. 3 only has to be able to recognize the necessary size for the fingerprint attestation. On the other hand, it is necessary to detect the time movement of the finger and the time movement of the pressure applied to fingerprint sensor part 4 to move the cursor displayed on display unit 2 of hand-held device 1. For instance, in the case of the time movement of pressure, because detected fingerprint 6b exists only in the upper side of fingerprint sensor part 4 when changed into from the state shown in FIG. 3 to the state shown in FIG. 4, it is understood that the pressing pressure moves only to upper side. The function to move the cursor to fingerprint sensor part 4 can be given by synchronizing the information on this pressure movement with the cursor motion.

Figure 5:
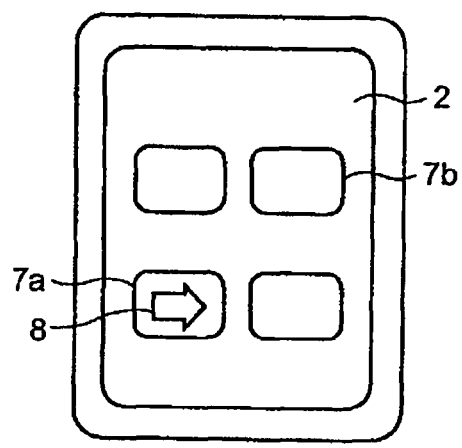
FIG. 5 is a front elevation showing an example of the screen displayed to the display unit.
Figure 6:
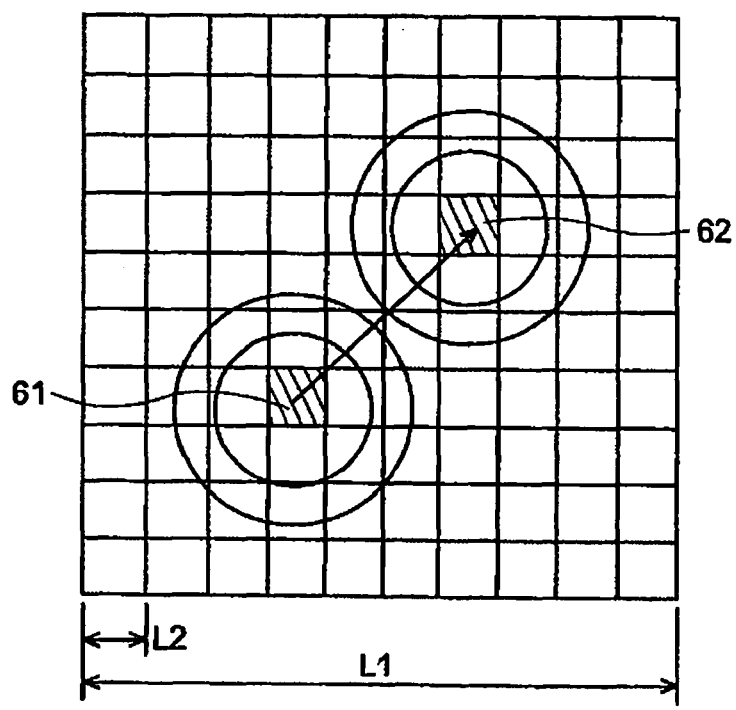
FIG. 6 is a diagrammatic illustration of the principle by which the movement of the finger in FIG. 5 is detected.

FIG. 5 is a front elevation showing an example of the screen displayed in display unit 2. FIG. 6 is a diagrammatic view showing the principle by which the movement of the finger in FIG. 5 is detected. The pressing pressure of the finger is changed or the finger is moved as shown in FIG. 4 when pointer 8 is moved from button 7a to button 7b among plural buttons displayed on the screen. In fingerprint sensor part 4, the detected position of the finger or center 61 of the pressure moves in a direction shown by the arrow, and it is detected that they have moved to center 62 of the pressure or a new position of the finger.

It is necessary to adjust the pitch of the pixel or the pressure-sensitive electrode to about 0.05 millimeters to recognize the fingerprint. On the other hand, it is preferable to set length L2 of one mesh from about 0.2 millimeters to 0.5 millimeters to the movement of the finger shown in FIG. 6. The computing speed slows, and cannot follow to the movement of the finger though the detection accuracy is improved if the size of this mesh is reduced.

Moreover, if the size of the mesh is enlarged, the movement of the cursor and the pointer of the display screen comes for the detection of the movement of the finger to roughen like the step, and they are not seen easily. The number of meshes for one side is from 20 to 50 when length L1 of one side of fingerprint sensor part 4 is assumed to be 10 millimeters. In such a mesh, the slow timing for detection is acceptable when the fingerprint which is the still picture is detected, and the speed from 4 frames a second to 5 frames a second is sufficient, but the speed from 10 frames a second to 15 frames a second is necessary for detecting the time change in the finger or the pressure. Therefore, the detection timing is changed according to the case that the fingerprint is detected or the case that the time change in the pressure or the finger is detected. There is an effect that it can be prevented that the user feels uncomfortable, because the behavior on the screen of the cursor or the pointer follows to the time change in the movement of the finger or pressure by composing like this, and provides the natural movement.

The finger or the pressure is detected not with the number of meshes as described above, but with 9 meshes in total where the number of meshes of one side is 3, when the pointer is not moved as shown in FIG. 5, but the menu is selected by moving the cursor up and down or right and left. Because the movement of the finger or the pressure need not be detected in detail if the area of fingerprint sensor part 4 divided into nine meshes is b eaten by the finger, and the cursor is moved in an arbitrary direction, the load of CPU can be decreased.

Figure 7:
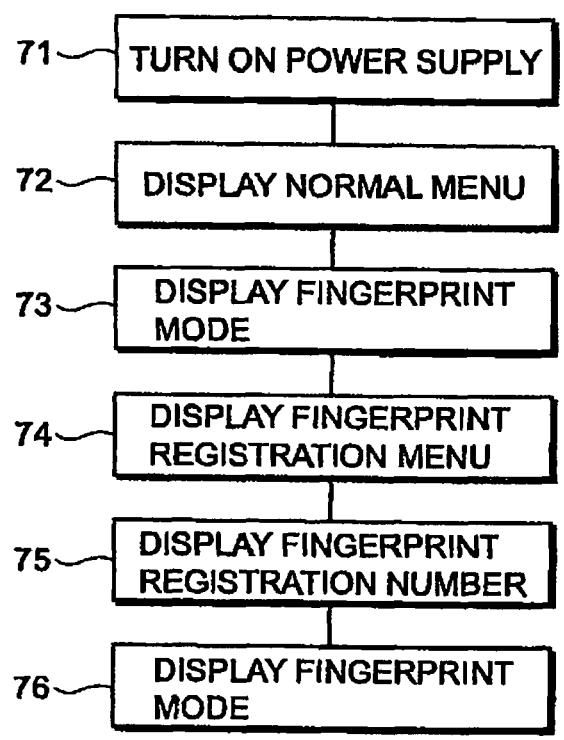
FIG. 7 is a flow chart showing the procedure when the fingerprint is registered.
Figure 8:
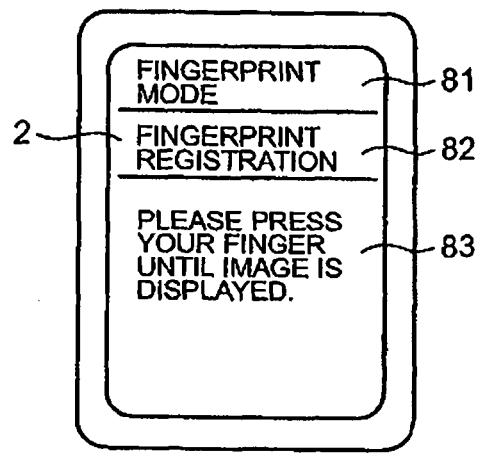
FIG. 8 is a front elevation showing an example of the screen displayed to the display unit.
Figure 9:
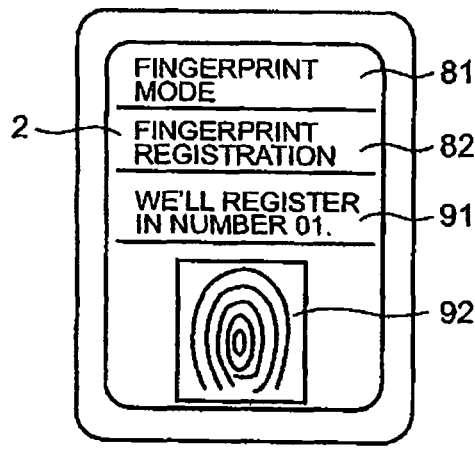
FIG. 9 is a front elevation showing an example of the screen displayed to the display unit.

FIG. 7 is a flow chart showing the procedure when the fingerprint is registered. FIG. 8 and FIG. 9 are a front elevation showing examples of the screen displayed in display unit 2.

After the power supply is turned on (step 71), a normal menu (not shown) is displayed (step 72). It is possible to display a fingerprint mode (not shown) (step 73) in the normal menu, and to display a fingerprint registration menu shown in FIG. 8 (step 74). Fingerprint mode display area 81, fingerprint registration display area 82, and message display area 83 are displayed on display unit 2. The belly of the arbitrary finger is pressed against fingerprint sensor part 4 according to the message of the message display area. The display screen is switched to the screen shown in FIG. 9 when the information necessary for registering the fingerprint is read. Registration confirmation display area 91 where addresses (ID) such as the number indicative of the registration of the fingerprint, etc. are displayed, and fingerprint image display area 92 where the image of the fingerprint is displayed by display unit 2 is displayed (step 75). Next, when pressing the finger strongly or when keeping pressing during the fixed time after moving the cursor to registration confirmation display area 91, the message (not shown) indicative of the completion of the fingerprint registration is displayed, and the processing returns to the screen display of fingerprint mode (not shown) (step 76).

Figure 11:
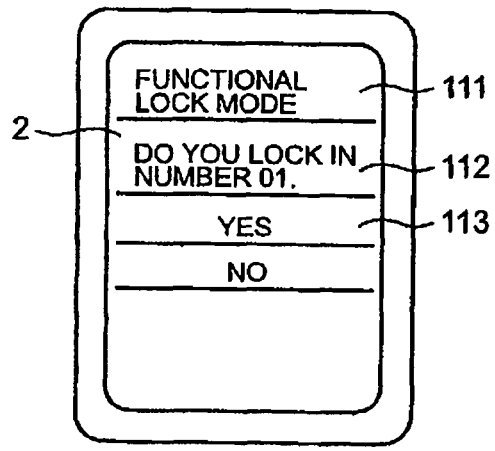
FIG. 11 is a front elevation showing an example of the screen displayed to the display unit.
Figure 10:
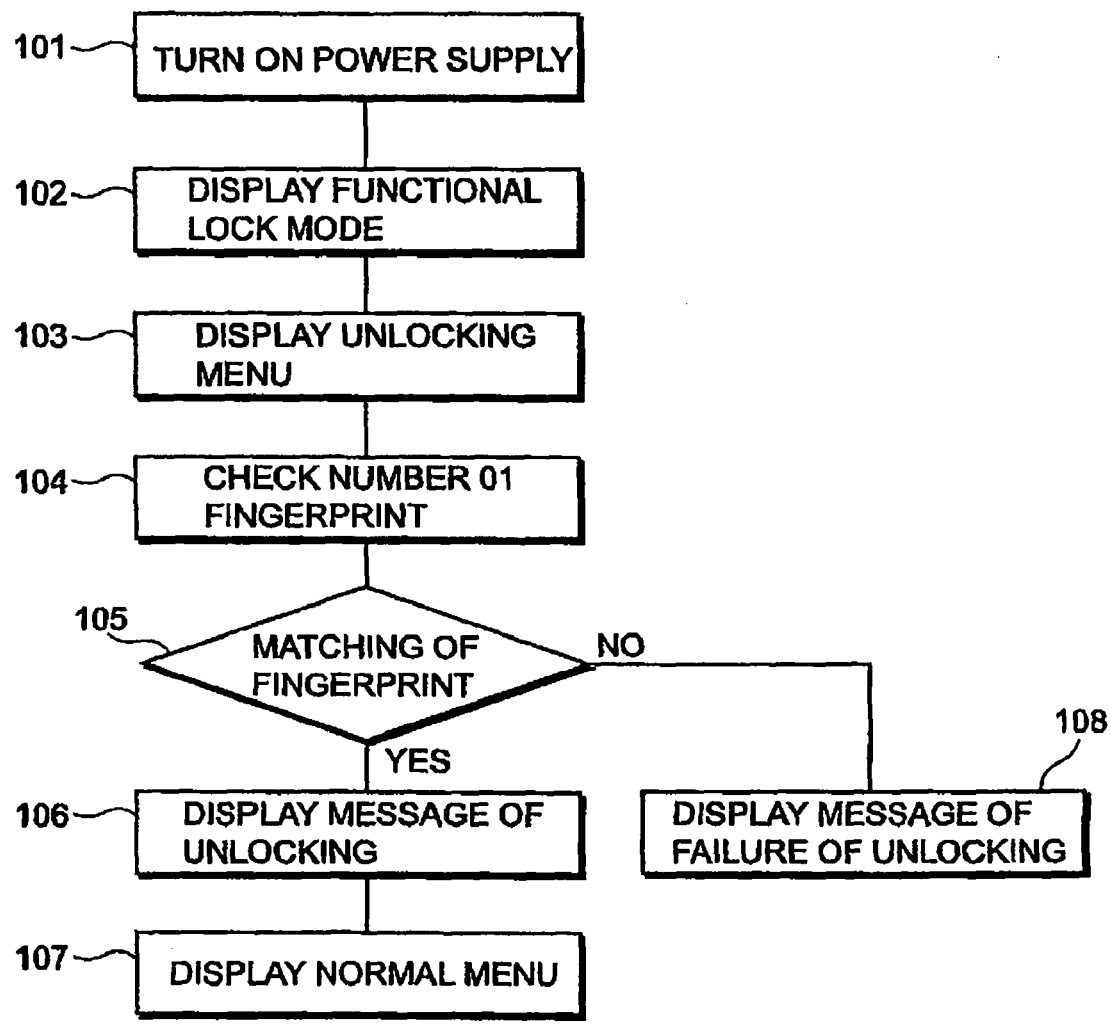
FIG. 10 is a flow chart showing the procedure when the function is locked.
Figure 12:
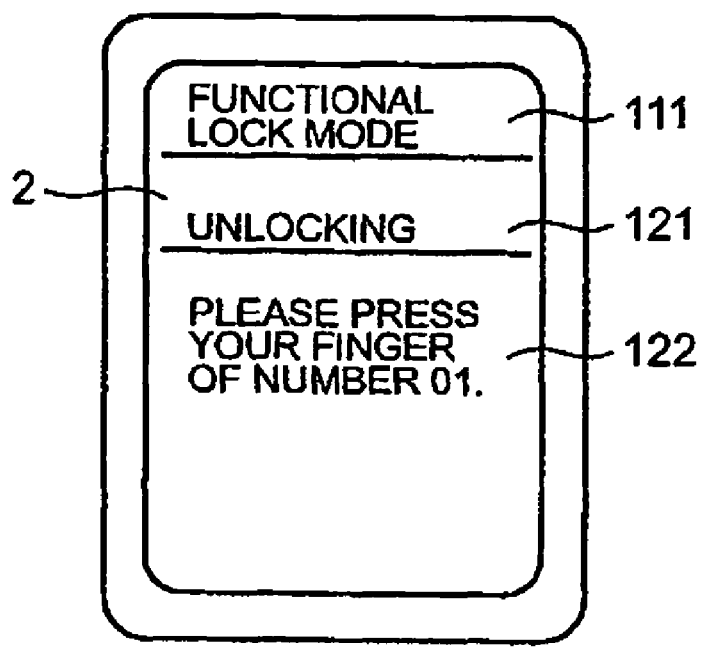
FIG. 12 is a front elevation showing an example of the screen displayed to the display unit.
Figure 13:
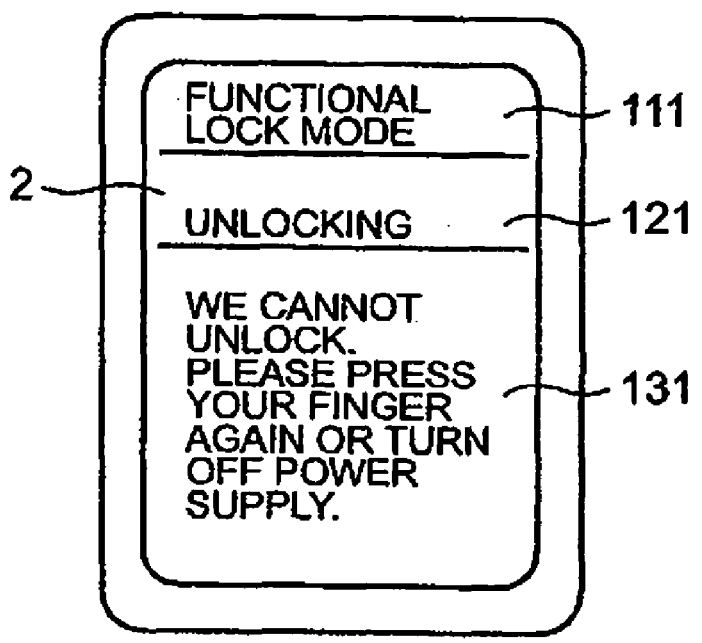
FIG. 13 is a front elevation showing an example of the screen displayed to the display unit.

FIG. 10 is a flow chart showing the procedure when the function is locked. FIG. 11 to FIG. 13 are front elevations showing examples of the screens displayed in display unit 2.

After the power supply is turned on (step 101), the function lock mode shown in FIG. 11 can be displayed from the normal menu (not shown) (step 102). In the function lock mode, display area 111 of the function lock mode lock is displayed, and further lock confirmation display area 112 and the answer display area 113 are displayed when not locked. The cursor is moved to "Yes" in answer display area 113 and "Yes" is specified by pressing strongly etc. when the user wants to lock various functions of the hand-held device. As a result, the fingerprint registered in address (ID) of the number etc. displayed in lock confirmation display area 112 is made an attestation fingerprint for unlocking, and the function is locked.

When the function lock mode is displayed from normal menu (not shown) when the function is locked, the unlocking menu shown in FIG. 12 is displayed (step 103). FIG. 12 shows an example of the display when the function lock is released. Unlocking display area 121 and message display area 122 are displayed on display unit 2. Address (ID) of the fingerprint for the fingerprint attestation necessary to release the function lock is displayed in message display area 122. The fingerprint is checked by pressing the corresponding finger against the fingerprint sensor part (step 104). It is judged whether the pressed fingerprint and the registered fingerprint are corresponding (step 105). When the fingerprint matches with each other, the function lock is released. The message of unlocking (not shown) is displayed (step 106), and the processing is returned to the display screen of normal menu (not shown) (step 107). When the fingerprint is not corresponding in step 105, the message of the unlocking failure shown in FIG. 13 is displayed (step 108). Message display area 131 for unlocking failure is displayed in display unit 2 shown in FIG. 13. The fingerprint attestation can be done over again by pressing the finger again because there is a possibility with the error when the fingerprint is attested though the user pressed a correct finger, too.

Thus, because arbitrary address (ID) of the finger registered for the fingerprint attestation can be specified for the function locking, the effect that the safety for function unlocking improves can be expected.

Figure 14:
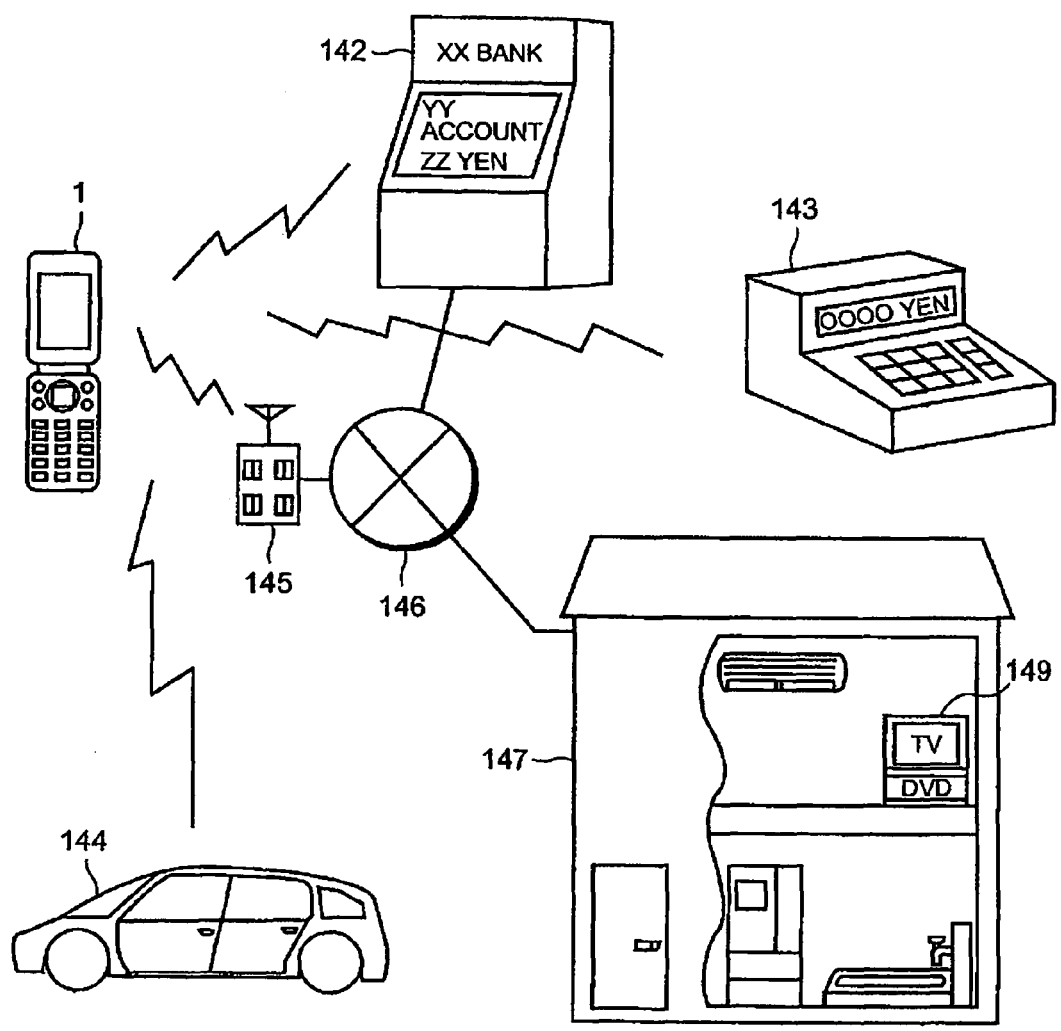
FIG. 14 is a block diagram showing an example of the communication network which centered on the hand-held device.

FIG. 14 is a configuration view showing one example of the communication network which centered on hand-held device 1 shown in FIG. 1. The fingerprint attestation information in hand-held device 1 is transmitted to the receiving end by using the radio communication technology such as Bluetooth (trademark) which is one of the infrared ray or the radio communication standards for instance. Various procedures of the bank account where the attestation is completed for instance are carried out with banking terminal 142 at the receiving end. Moreover, when shopping, it is possible to pay by the electronic money at register 143 of the shop. Further, the locking and the unlocking actions of the door can be carried out in automobile 144, user's own house or office 147. There are the case that executes the fingerprint attestation in hand-held device 1, encrypts the information on the attestation completion and transmits the same, and the case that transmits the fingerprint information acquired by the fingerprint sensor, and executes the attestation at the receiving end. Thus, because it can surely be attested whether the user is he/she by the fingerprint attestation, the effect of crime prevention can be expected. Moreover, In the case that the control information is transmitted from hand-held device 1 to service center 145 to control information appliances 149 in user's own house or office 147 when he/she goes out for instance, and is transmitted to user's own house or office 147 via the communication network such as Internet 146 etc., it can be prevented that information appliances 149 is controlled by wrong information by transmitting only the control information permitted based on fingerprint attestation information transmitted from hand-held device 1 from service center 145 to information appliances 149.

It is not necessary to execute various procedures after the fingerprint attestation is carried out, because the fingerprint can be acquired even during the cursor movement by providing the cursor movement function in the display unit to the fingerprint sensor. For instance, the fingerprint can be attested at the same time while directing the processing of the bank account. Therefore, it is possible to confirm whether the operator is the person concerned without allowing the fingerprint attestation being done to the operator to be considered.

Figure 15:
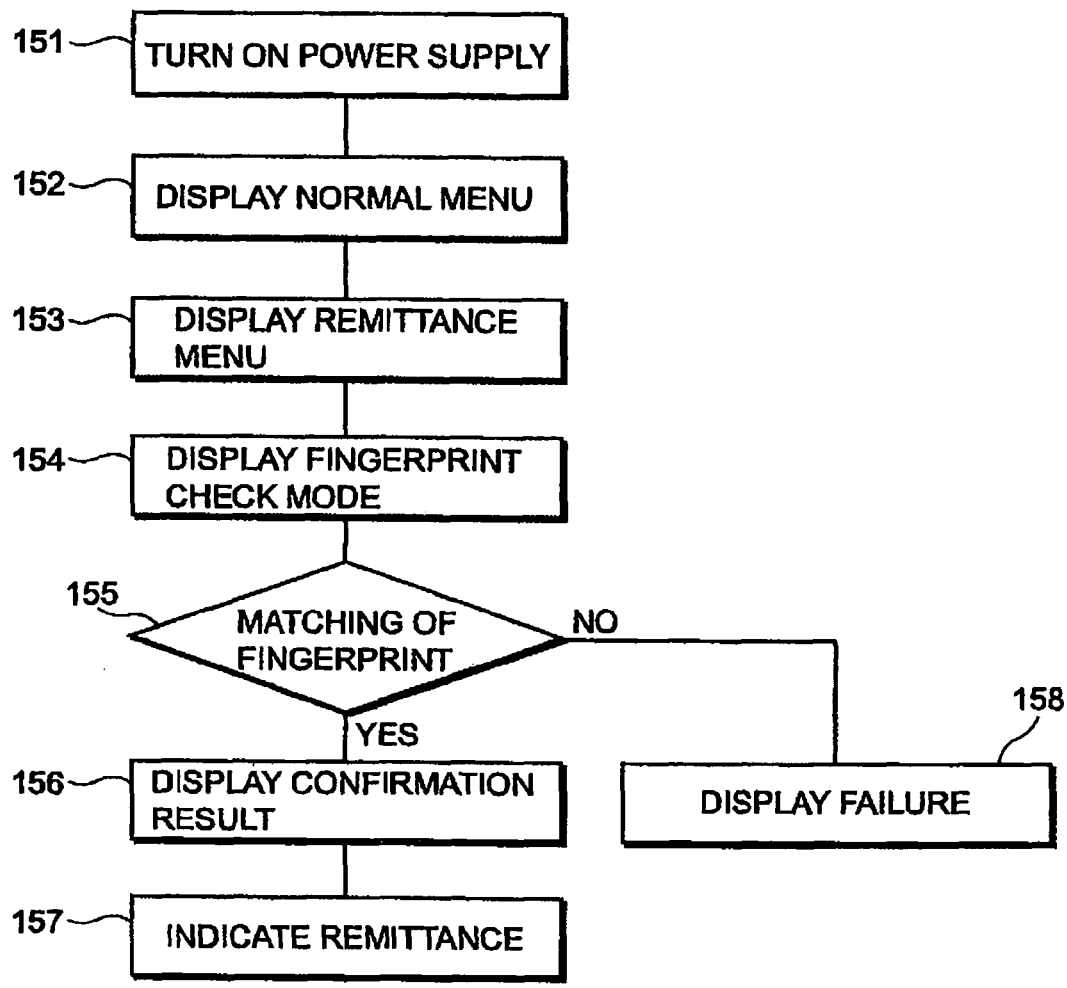
FIG. 15 is a flow chart showing the procedure in the remittance mode.
Figure 16:
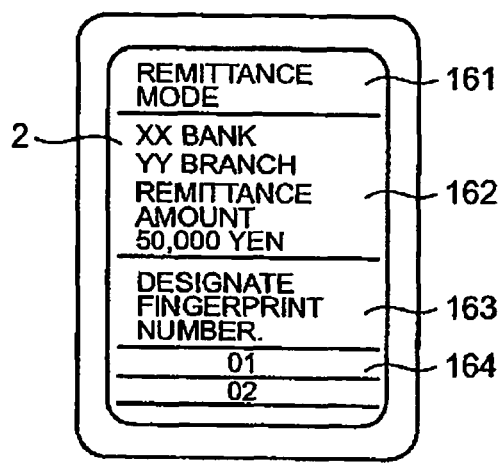
FIG. 16 is a front elevation showing an example of the screen displayed to the display unit.
Figure 17:
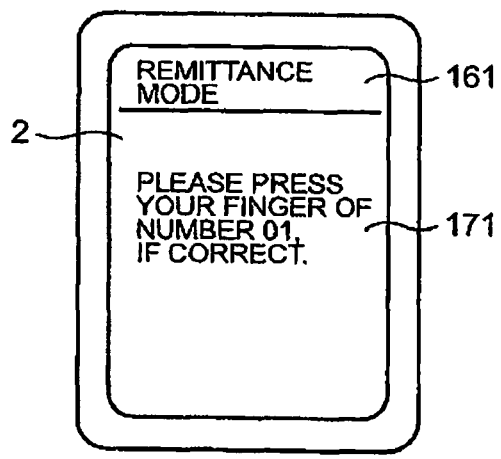
FIG. 17 is a front elevation showing an example of the screen displayed to the display unit.
Figure 18:
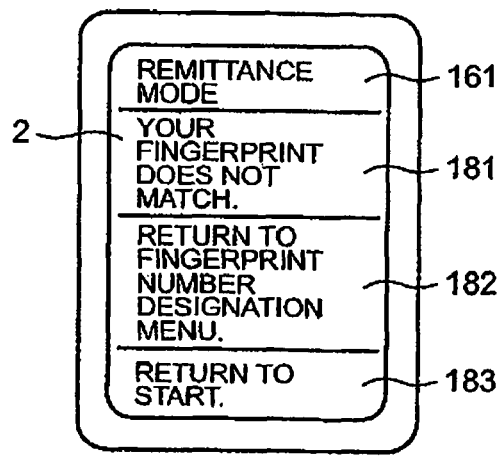
FIG. 18 is a front elevation showing an example of the screen displayed to the display unit.

FIG. 15 is a flow chart showing the procedure in a remittance mode. FIG. 16 to FIG. 18 are front elevations showing examples of the screens displayed in display unit 2.

One example of the fingerprint attestation at the remittance is explained as one example of various procedures of the bank account attested with banking terminal 142 shown in FIG. 14. In FIG. 15, normal menu (not shown) is displayed (step 152) after the power supply is turned on (step 151). And, remittance mode (not shown) is displayed (step 153), and the fingerprint check mode in the remittance mode shown in FIG. 16 is displayed (step 154). Remittance mode display area 161, transfer information display area 162, message display area 163, and answer area 164 are displayed in display unit 2. The screen of the fingerprint attestation shown in FIG. 17 is displayed when the fingerprint number in answer area 164 is specified, that is, address (ID) of the registered fingerprint is specified according to the message in message display area 163 by moving the cursor. Message display area 171 is displayed in display unit 2. The fingerprint is attested by pressing the finger against fingerprint sensor part 4 shown in FIG. 1. It is judged whether the fingerprint in registered address (ID) and the pressed fingerprint are corresponding (step 155). When the fingerprint is matching, the result is displayed and it is confirmed whether to perform remittance (step 156). If the consent of the user is obtained, the remittance is directed (step 157). When the fingerprint is not corresponding in step 155, the failure is displayed as shown in FIG. 18 (step 158). Message display area 181, and designation areas 182, 183 are displayed in display unit 2. The fingerprint number can try again because the screen returns to one which can designate the fingerprint number shown in FIG. 16 when the cursor is directed and specified to support area 182. The processing returns to the screen of remittance mode (not shown) when designation area 183 is specified. If the fingerprint is not corresponding in step 155 shown in FIG. 15, it is also possible to display the reconfirmation screen shown in FIG. 13.

Plural persons' fingerprints can be attested with one hand-held device by registering plural fingerprints as the fingerprint number, that is, address (ID). Moreover, it is possible to associate the fingerprint attestation with the information to improve safety by registering plural fingerprints for which the attestation is necessary every bank account. For instance, as the fingerprint number displayed in answer area 164 in FIG. 16, the fingerprint of the user himself is registered in the number $01^{st}$, the fingerprint of Mr. A is registered in the number $02^{nd}$, the fingerprint of Mr. B is registered in the number $03^{rd}$. The same hand-held device can make the procedure of the remittance for two or more persons possible by associating them with the source account beforehand when remitting. Moreover, for instance, the left hand thumb of the user himself is registered in the number $01^{st}$, the left hand forefinger in the number $02^{nd}$, and the right hand thumb in the number $03^{rd}$, and the account A of band A is associated with the number $01^{st}$, the account B of band B is associated with the number $02^{nd}$, and the account C of band C is associated with the number $03^{rd}$. Because it is possible to deal only when the left hand thumb of the user himself registered to the number $01^{st}$ is judged to be correct by the fingerprint attestation in such a case, the safety is improved.

The usage of the registration of the fingerprint is not limited to the remittance procedure. For instance, assumed that the left hand thumb registered in the number 01st is associated with contact addresses of Mr. A's telephone number etc., the left hand forefinger registered in the number $02^{nd}$ with Mr. B's contact addresses, and the right hand thumb registered in the number $03^{rd}$ with Mr. C's contact addresses, it is possible to use a fingerprint attestation function as a one-touch dial to contact by the telephone etc.

Because the cursor or the pointer on the display screen is moved by providing the fingerprint attestation function to the hand-held device and by detecting the movement of the belly side of the finger just by moving it up and down or right and left according to the above-mentioned configuration, the cursor button need not be provided in the surroundings of the fingerprint sensor. Therefore, excellent effects that are excellently operational, multi-functional and compact can be achieved, and the design is also simplified.

Moreover, because the timing when said time change is detected is decided according to a time change in the movement of the finger, the behavior on the screen of the cursor or the pointer follows to the time change in the movement of the finger, and provides the natural movement. Accordingly, there is an effect that it can be prevented that the user feels uncomfortable.

Moreover, though the fingerprint is registered by pressing the arbitrary finger against the fingerprint sensor until the information necessary for registering the fingerprint can be read, the information enough for the fingerprint attestation because the message indicative of the completion of said fingerprint registration is displayed.

Moreover, arbitrary address (ID) of the finger registered for the fingerprint attestation for the function locking can be specified by displaying the address (ID) of the fingerprint registered as an attestation fingerprint for the function unlocking. Therefore, the effect that the safety for function unlocking is improved can be expected. Two or more fingerprints detected with the fingerprint sensor are memorized, each fingerprint is associated with information, and is registered in the information registration means.

Moreover, with regard to the use of the registered information, the use of information registered in the information registration means is permitted only when the fingerprint input is corresponding to the fingerprint which is associated with the information registered in the information registration means and registered. Therefore, the effect that safety is improved can be expected.

Moreover, one embodiment of the present invention comprises a fingerprint sensor for fingerprint attestation provided on a control panel, and a display unit which displays an image, wherein step is provided between said control panel and said fingerprint sensor. The positioning of the finger becomes easy, the displacement of the finger at the fingerprint attestation can be prevented, and the operability is improved.

As described above, a hand-held device with built-in fingerprint sensor on control panel can be provided according to the present invention, which does not ruins the operability of the movement of the cursor or the pointer on the display screen.

The invention claimed is:

1. A hand-held device with a built-in fingerprint sensor comprising:
   a display unit which displays an image,
   a control panel
   a fingerprint sensor for fingerprint attestation provided on said control panel,
   a unit that moves a cursor or a pointer displayed on said display unit according to movement of a finger on said sensor side or a time change in the position of the applied pressure obtained by detecting the movement of the finger on said sensor side or the time change in the position of the applied pressure,
   wherein an area of said fingerprint sensor is divided into a grid of 9 meshes in total where a number of meshes of one side is 3,
   said unit that moves a cursor detects the movement of the finger or the movement of the applied pressure in any one of the meshes, and moves the cursor displayed on said display unit, and
   said fingerprint sensor carries out the fingerprint attestation during the movement of the cursor displayed on said display unit.

2. The hand-held device with built-in fingerprint sensor as set forth in claim 1, wherein timing when said change is detected is decided according to a time change in the position of the finger on said sensor side or the applied pressure.

3. A hand-held device with a built-in fingerprint sensor comprising:
   a pressure sensor part for fingerprint attestation and for detection of movement of an arbitrary finger, provided on a control panel, and
   a display unit which displays a message indicative of the completion of fingerprint registration after said finger is pressed against said pressure sensor until the information necessary for registering fingerprint can be read,
   wherein said pressure sensor part is divided into a grid of 9 meshes where a number of meshes of one side is 3, and
   wherein said pressure sensor part is detects movement of said finger in any of one of the meshes, and moves the cursor displayed on said display unit, and
   wherein a cursor or a pointer displayed on a display unit moved according to a time change in the position where said finger is pressed on the sensor side of the pressure sensor.

4. The hand-help device with built-in fingerprint sensor as set forth in claim 3, wherein the message indicative of the completion of said fingerprint registration at least contains an address (ID) where the fingerprint is registered.

5. The hand-held device with built-in fingerprint sensor as set forth in claim 3, wherein the message indicative of the completion of said fingerprint registration at least contains the image of the fingerprint concerned.

6. The hand-held device with built-in fingerprint sensor as set forth in claim 3, wherein two or more fingerprints are registered in said fingerprint registration.

7. The hand-held device with built-in fingerprint sensor as set forth in claim 1, further comprising:
- a fingerprint sensor for attestation provided on a control panel, and
- a display unit which displays an image,
- wherein step is provided between said control panel and said fingerprint sensor.

8. The hand-held device with built-in fingerprint sensor as set forth in claim 7, wherein said fingerprint sensor is at the position lower than said control panel in said step.

9. The hand-held device with built-in fingerprint sensor as set forth in claim 7, wherein said step has the outline with height from them to the boundary part of said control panel and said fingerprint sensor.

10. A hand-held device with built-in fingerprint sensor according to claim 7, comprising a control panel provided with two or more buttons, and a display unit which displays an image, further comprising;
- a fingerprint sensor part provided on the positions where it is easy for the belly side of finger to touch when holding said control panel with either one of right and left hands.

11. A hand-held device with a built-in fingerprint sensor comprising:
- a display unit which displays an image,
- a control panel
- a fingerprint sensor for fingerprint attestation provided on said control panel,
- a means which moves a cursor or a pointer displayed on said display unit according to movement of a finger on said sensor side or a time change in the position of the applied pressure obtained by detecting the movement of the finger on said sensor side or the time change in the position of the applied pressure,
- wherein an area of said fingerprint sensor is divided into a grid of 9 meshes in total where a number of meshes of one side is 3,
- said means which moves a cursor detects the movement of the finger or the movement of the applied pressure in any one of the meshes, and moves the cursor displayed on said display unit, and
- said fingerprint sensor carries out the fingerprint attestation during the movement of the cursor displayed on said display unit.

* * * * *